United States Patent Office 2,992,953
Patented July 18, 1961

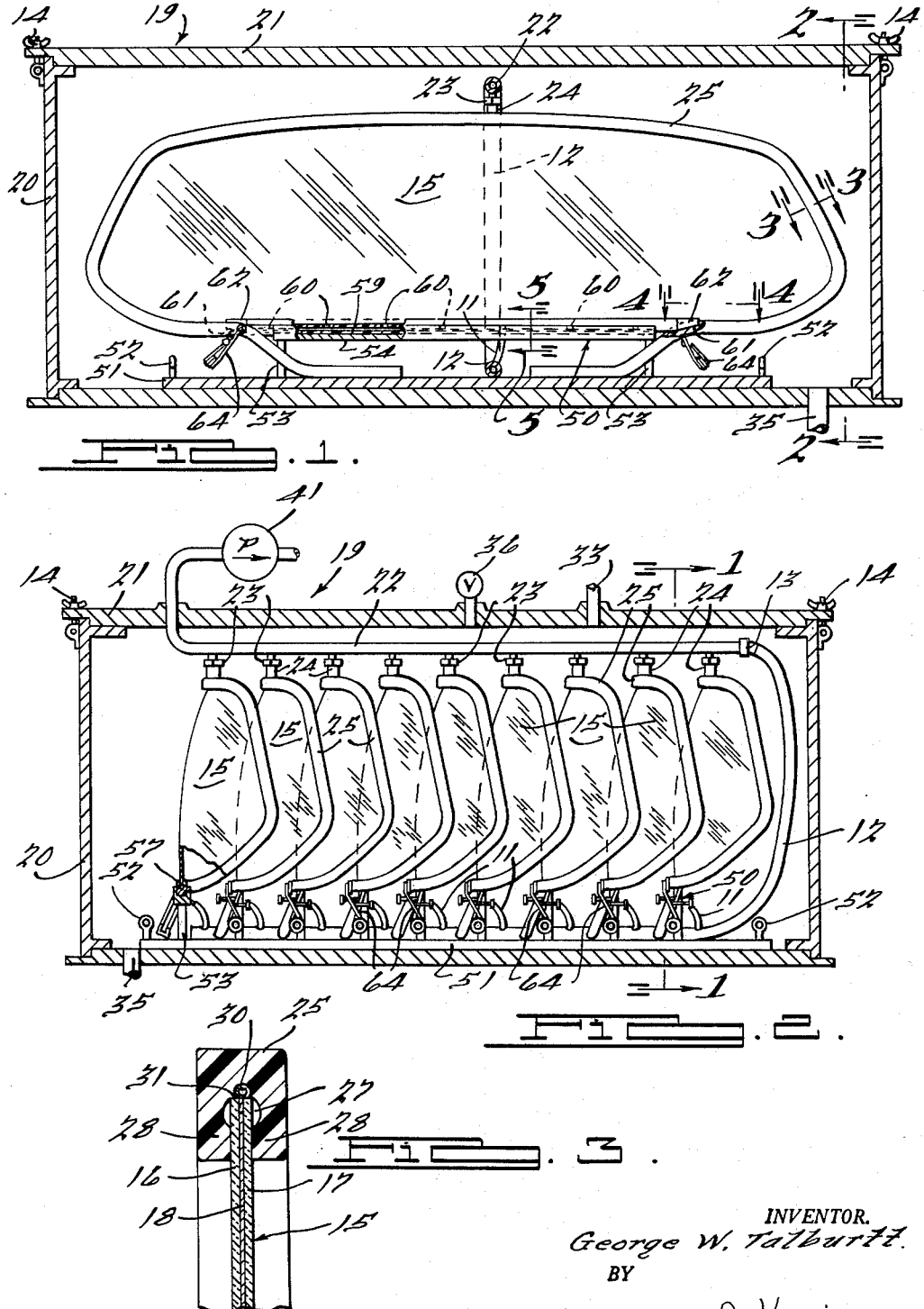

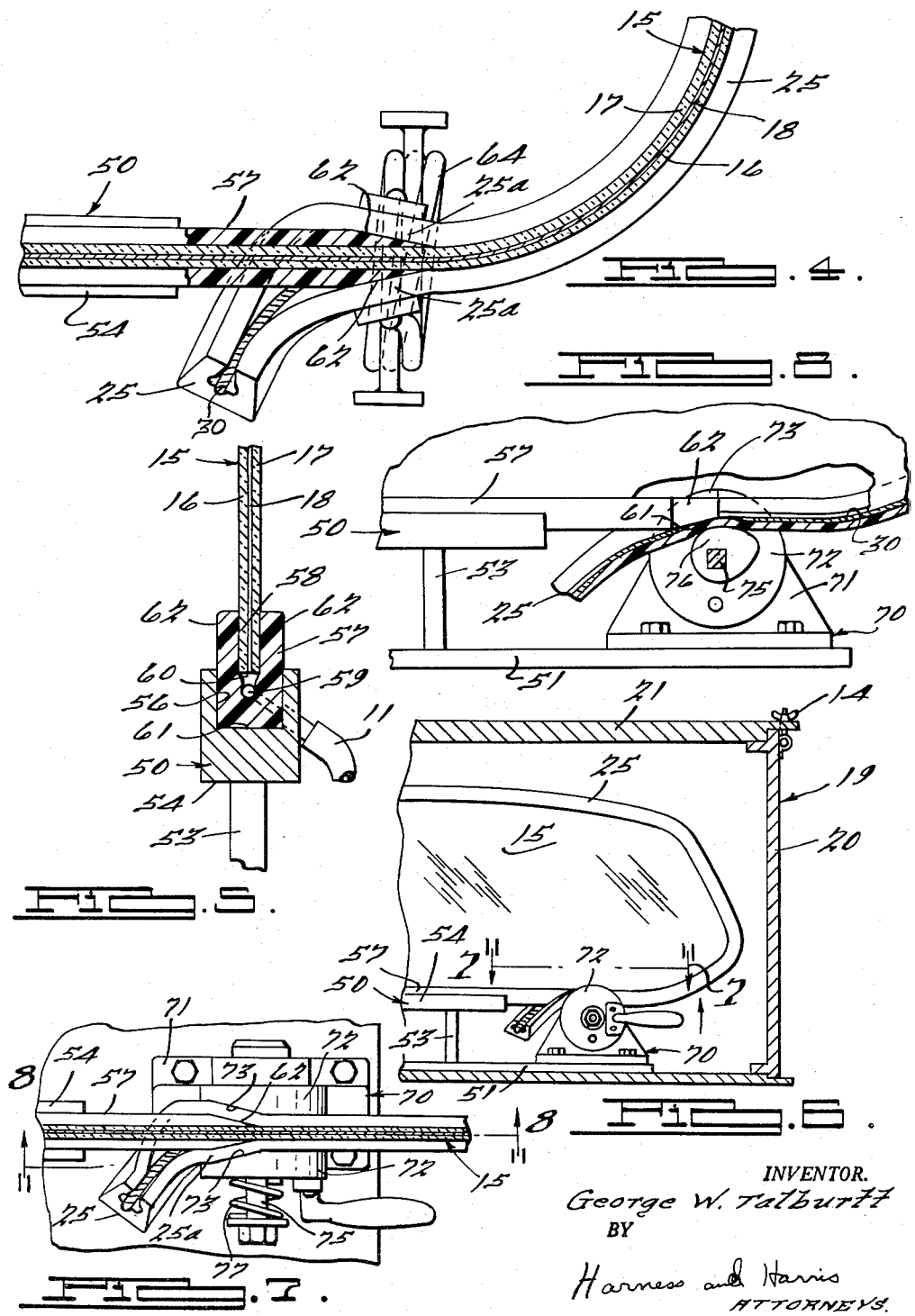

2,992,953
GLASS LAMINATING DE-AIRING MEANS
George W. Talburtt, Birmingham, Mich., assignor to Chrysler Corporation, Highland Park, Mich., a corporation of Delaware
Filed Feb. 23, 1960, Ser. No. 10,136
12 Claims. (Cl. 154—2.7)

This invention relates to an evacuation or de-airing means for use in a lamination process, particularly an evacuation means adapted for the elimination of air or gas from between the layers of the materials that are to be pressed together to form the laminated structure. This invention is directed primarily to the provision of a de-airing ring for a laminate assembly formed from a grooved laminate supporting strip and a cooperating length of flexible channeled tubing that is adapted to be wrapped about the periphery of the laminate assembly and anchored to the grooved supporting strip.

In the laminating of layer-like materials, such as a pair of interlayer spaced glass sheets, one of the problems that has to be overcome is the elimination of any air or gas from between the laminated layers prior to bonding of the layers into a unitary laminated structure. In the formation of a safety glass windshield wherein a plastic interlayer is placed between and bonded to a pair of glass plates, means must be provided for withdrawing or evacuating any air or gas that might otherwise be trapped between the glass layers during the laminating process. To accomplish this evacuation process it has been proposed to surround the peripheral edges of the glass sandwich with evacuation tubing, such as the tubing shown in the Drake Patent 1,870,284, and then apply a suction to the tubing at the same time that heat and pressure are applied to the exterior surfaces of the glass plates. The noted Drake patent teaches the mounting of suction tubing on detachable, rigid, frame sections that must be individually tailored to each specific glass shape. Realizing the limitations and expense involved in the use of de-airing frames such as shown by Drake, one of the next steps in the development of commercial de-airing devices was the use of endless resilient de-airing rings. These endless rings were an improvement, but they were limited to specific sizes and they were difficult and time consuming to apply. This invention represents a further step in the improvement of de-airing devices over the two previously mentioned de-airing devices. This invention does not require a specifically shaped frame nor does it require a number of different size endless resilient de-airing rings. In this invention a grooved supporting frame of universal application is combined with a length of channeled de-airing tubing in such a manner that a single length of tubing can be easily applied to and used to de-air any and all sizes and shapes of laminate assemblies that forseeably would be manufactured at the same time.

It is a primary object of this invention to provide an improved and simplified form of de-airing means for laminate assemblies which means has universal application to the various sizes and shapes of laminate assemblies that it might be desired to fabricate.

It is still another object of this invention to provide a laminate assembly de-airing means that is quick and easy to apply to the periphery of the laminate assembly while insuring an effective evacuation of the space between the several laminates.

It is a further object of this invention to provide a de-airing means for a laminate assembly comprising a support portion that may be a fixed portion of a pressure chamber and a length of channeled de-airing tubing that is readily mounted about the periphery of different sized and shaped laminate assemblies and anchored to the support portion in a novel manner such that a quick, effective, economical de-airing process can be accomplished.

Other objects and advantages of this invention will become readily apparent from a reading of the following description and a consideration of the related drawings, wherein:

FIG. 1 is a sectional elevational view, with portions broken away, taken along line 1—1 of FIG. 2, showing an evacuation means embodying this invention applied to the periphery of a laminate assembly intended for a motor vehicle windshield;

FIG. 2 is a sectional elevational view taken along the line 2—2 of FIG. 1 with portions broken away to clearly disclose certain details;

FIG. 3 is an enlarged, fragmentary, sectional elevational view taken along the line 3—3 of FIG. 1;

FIG. 4 is another enlarged, fragmentary sectional elevational view taken along the line 4—4 of FIG. 1;

FIG. 5 is another enlarged, sectional elevational view taken along the line 5—5 of FIG. 1;

FIG. 6 is a fragmentary, sectional, elevational view of a modified form of the invention shown in FIGS. 1–5;

FIG. 7 is a plan elevational view taken along the line 7—7 of FIG. 6; and

FIG. 8 is a enlarged sectional elevational view taken along the line 8—8 of FIG. 7.

The reference numeral 15 represents a curved glass vehicle windshield composed of the spaced glass panels 16 and 17 that are joined together by a plastic interlayer sheet 18 arranged therebetween and bonded thereto. It is common practice to join the spaced glass panels 16, 17 to the plastic interlayer 18 by means of heat and pressure applied to the exterior surfaces of the glass panels 16, 17 in an autoclave unit such as that generally indicated by the numeral 19 in FIGS. 1 and 2. Autoclave unit 19 includes a tank 20 having a removable cover 21 that supports an air evacuation or suction line 22 on its interior surface. Cover 21 may be latched to tank 20 by pivotally mounted anchor or hatch bolt connections 14.

Connected to the suction line 22 are a number of quick-disconnect, self-sealing, valve controlled nozzles 23 that are adapted to be joined to the tube-like, neck portions 24 of the de-airing strips that are each generally designated by the reference numeral 25. Suction line 22 is connected to some sort of a suction source 41 that may be a motor driven pump or the like. The cover 21 of the autoclave unit 19 preferably includes a pressure fluid discharge conduit 33 and a pressure safety valve 36. Also connected to the suction line 22 by a self-sealing, quick-disconnect, connection 13 is another suction hose 12. Suction hose 12 is arranged to be connected by branch line conduits 11 to the several support frames 50 that will be described in detail hereafter.

The de-airing means, embodying this invention, includes the length of channeled tubing 25 formed of a resilient material of rubber-like composition. The strip 25 has a more or less U-shaped cross sectional configuration as clearly shown in FIG. 3. The body portion of strip 25 includes a longitudinally extending groove 27 that extends inwardly from the inner side edge thereof between the spaced leg portions 28. The groove 27 is adapted to receive the peripheral portions of the glass panel laminate structure 15. There may be mounted in the groove 27 of the strip 25 so as to extend longitudinally thereof adjacent the bight portion of the groove 27 an extensible coil spring 30. The coil spring 30 is highly resistant to radial collapse and is adapted to abut against the end edge 31 of the glass laminate 15 when the de-airing ring 25 is mounted about the peripheral portions of the glass laminate 15. The anti-collapse spring 30 is not a part of this invention as it is covered by a copending patent application of Harvey J. Little, Serial No. 856,053, filed November 30, 1959.

As shown in FIGS. 1, 2 and 5, the glass laminate assemblies 15 are supported in the autoclave unit 19 by means of grooved support portions or racks 50 that are fixedly mounted on a base plate 51. Plate 51 may be raised from and lowered into the autoclave tank 20 by means of the cleats 52 that are adapted to be connected to a chain hoist mechanism or the like (not shown). Each of the support racks 50 comprises spaced legs 53 that carry a grooved bar 54. Seated in the groove 56 of bar 54 is a grooved resilient support member 57 that is preferably of rubber-like material. The groove 58 in the support member 57 is of such a size and shape as to matingly receive in sealing engagement portions of the lower peripheral edge of the laminate assembly 15. While it is not absolutely necessary, still, it is preferable that the grooved laminate support member 57 have a suction conduit 59 formed therein and arranged to be connected to the suction branch conduits 11 that are a part of the suction hose 12. Bores 60 in resilient member 57 connect the suction conduit 59 to the adjacent edge of the laminate assembly 15.

As can be seen from FIGS. 1 and 4, the opposite end portions of the resilient support strip 57, which ends are identical, are tapered along their bottom face 61 and along their sides 2. These tapered end portions on the resilient support strip 7 are adapted to be nested within the groove 27 in those portions of the channeled evacuation strip 25 that are pressed on to the tapered ends of the support strip when the strip 25 is wrapped about the periphery of the laminate assembly 15. After enclosing the tapered ends of the support strip 57 with the adjacent portions of the evacuating strip 25, a suitable type of releasable clamp 64 is applied to the overlapped portions 25a, 62 (see FIG. 4) to firmly hold these overlapped portions in sealing engagement. The unused portions of the evacuation or de-airing strip 25 that extend beyond the clamps 64 are merely folded under the associated support racks 50. It is thought to be clear from the foregoing description and associated drawings that the overlapped de-airing strip portions 25a and support strip end portions 61, 62 provide a leakproof or sealed connection that will facilitate evacuation of the spaces between the glass laminates 16, 17, 18 when suction is applied to the conduit 22. It is obvious that other types of sealed joints can be utilized between strip portions 25a and the end portions of the support strip 57 than the specific joint shown without departing from the invention shown in the drawings and specifically covered in the appended claims.

In carrying out a laminating process that utilizes this invention, it is usual to first form the glass panels 16, 17 to the desired shape and to then insert a plastic interlayer 18 between the glass plates 16 and 17 so as to provide the laminate assembly or sandwich construction that is generally designated by the reference numeral 15. The next stage in the laminating process is to mount the laminate assembly 15 in the channeled supporting portion 57 and then apply the suction strip 25 about the exposed peripheral edges 31 of the laminate sandwich 15. The overlapping of the ends of the support strip 57 with the adjacent portions of the de-airing strip 25 provides a sealed connection so that suction can be effectively applied to both strip 25 and strip 57. When suction is then applied to the grooves 27 in the de-airing strips 25 through the strip neck portions 24 that are each connected by quick-disconnect, self sealing coupling 23 to the header 22 all gas or air will be evacuated from the space between the glass laminates 16, 17 and the interlayer 18. If the support portion 57 is provided with a suction bore 59 then at the same time that suction is being applied to the strip 25 suction can also be applied to the support strip 57 through the branch conduits 11, 12 that are connected to the header 22. This additional evacuation means may not be necessary in all cases.

This de-airing process is preferably carried on in the autoclave unit that is generally designated by the reference numeral 19 in FIGS. 1 and 2. As can be seen from FIGS. 1 and 2 the autoclave unit has the supports 50 arranged to hold the glass windshield assemblies 15 in closely adjacent, substantially vertical positions with the de-airing strips 25 attached to the peripheral surfaces of the windshield assemblies. The tube-like neck portions 24 of the de-airing strips 25 are connected to the self-sealing, quick-disconnect nozzles 23 that depend from the suction line header 22. While the air is being evacuated from between the glass layers 16, 17 of the glass sandwich 15 through the de-airing strips 25 and suction line 22, steam or some other hot pressurized fluid is supplied to the interior of the autoclave tank 20 through the supply conduit 35. The heat and pressure from the fluid contained within the autoclave unit 19 softens the plastic interlayer 18 and applies external pressure to the glass panels 16, 17 so as to effect the bonding of the glass layers 16, 17 to the interlayer 18. The external pressure on the panels 16, 17 further assists in squeezing any entrapped air from the space between the glass layers 16, 17 at the same time that the suction conduit 22 is withdrawing air therefrom through the conduit formed by the channeled strip 25 that runs along the end edges 31 of the glass laminate 15. The process herebefore described can be utilized for either edge tacking or completely laminating the panels 16, 17.

The advantages resulting from the use of a channeled suction strip 25 in combination with a grooved supporting strip 57 are thought to be rather evident. First, such a strip can be used on a large number of different sized and different shaped laminate structures because of the flexibility of the strip and the fact that no definite length strip is required. Second, the strip provides a protective shield around the edges of the windshield assembly to prevent chipping or cracking of the glass assemblies during handling in the laminating process. Third, the strips 25 are labor saving in that they can be quickly and easily applied to and removed from the peripheral portions of the glass laminates 15. Fourth, they are much less expensive than a tacking bag or any other types of equipment heretofore used for de-airing processes. Fifth, the utilization of the rack 50 as a support for the laminate assemblies 15 in the autoclave 19 and as a means to seal the effective ends of the de-airing strip 25 provides a novel dual function for the supports 50.

While this invention has been disclosed in combination with an autoclave unit 19 wherein the heating and pressing of the plastic interlayer occurs while the evacuation process is being carried on through the strip 25, still, it is to be pointed out that the evacuation strip 25 can be used at any time and in any surroundings to de-air the laminate 15 and then the strip enclosed assembly 15 can be disconnected from the suction nozzles 23 and the de-aired laminate 15 stored or moved to some other position for a subsequent operation.

FIGS. 6, 7 and 8 show a modified form of this invention wherein a pair of spaced roller cam means generally indicated at 70 are used to sealingly engage the tapered end portions 62 of the support unit resilient member 57 with the adjacent portions 25a of the sealing strip 25. Cam means 70 each comprise a support 71 that mounts a pair of axially spaced rotatable cam wheels 72. Each of the cam wheels 72 has a tapered circumferentially extending groove portion 73 that is adapted to receive the portions 25a of strip 25. Rotation of wheels 72 causes compressive engagement of the strip portions 25a with the tapered sides 62 on the ends of the resilient support strip 57. Mounted on the same shaft 75 that carries the spaced roller cam wheels 72, 72 and located between the cam wheels 72, 72 is a cam 76.

Cam 76 is adapted to be rotated into engagement with the bottom end of the strip 25 to cause it to be sealingly engaged with the tapered bottom face 61 of the resilient strip 57 at the same time that cam portions 73 are compressing the tapered sides 62 of the strip 57 into leakproof engagement with the side portions 25a of the sealing strip 25. It is also preferable to mount a compression spring 77 on the shaft 75 to continuously urge the cam wheels 72, 72 and the cam 76 together. It is foreseeable that other types of cam operated means such as some form of pivoted bail, or the like, could be used in place of the cams 72, 76 to compress the side portions and bottom face of the sealing strip 25 against the end portions 61, 62 of the resilient support strip 57. Any mechanical equivalents of the cams 72, 76 are intended to be covered by the appended claims.

I claim:

1. Apparatus for evacuating the space between the laminate sheets of a laminate assembly comprising an elongated grooved sealing strip adapted to have the grooved portion thereof matingly mounted about a major portion of the periphery of the laminate assembly to be evacuated, and a support member adapted to seat against the remaining portion of the periphery of the assembly to be evacuated and to matingly engage spaced portions of said sealing strip to seal off the sealing strip grooves at the ends of the sealing strip portions mounted on said laminate assembly.

2. Apparatus for evacuating the space between the laminate sheets of a laminate assembly comprising an elongated grooved sealing strip adapted to have the grooved portion thereof matingly mounted about a major portion of the periphery of the laminate assembly to be evacuated, a support member adapted to seat against the remaining portion of the periphery of the assembly to be evacuated and to matingly engage spaced portions of said sealing strip to seal off the sealing strip grooves at the ends of the sealing strip portions mounted on said laminate assembly, and clamping means applied to said matingly engaged strip and support portions to maintain these engaged portions of the sealing strip and support in sealed contact.

3. Apparatus for evacuating the space between the laminate sheets of a laminate assembly comprising an elongated grooved sealing strip adapted to have the grooved portion thereof matingly mounted about a major portion of the periphery of the laminate assembly to be evacuated, a support member adapted to seat against the remaining portion of the periphery of the assembly to be evacuated and to matingly engage spaced portions of said sealing strip to seal off the sealing strip grooves at the ends of the sealing strip portions mounted on said laminate assembly, clamping means applied to said matingly engaged strip and support portions to maintain these engaged portions of the sealing strip and support in sealed contact, and a suction source connected to said sealing strip grooved portion to apply a reduced pressure to the edge portions of the laminate assembly enclosed by said sealing strip.

4. In an apparatus as set forth in claim 3 wherein the support member comprises a channeled resilient element adapted to matingly receive in its channel portion said remaining portion of the periphery of the laminate assembly.

5. In an apparatus as set forth in claim 4 wherein the channeled element of the support member is arranged to have a reduced pressure applied to its channel portion to assist in evacuation of the space between the laminates of the laminate assembly.

6. Apparatus for evacuating the space between the laminate sheets of a laminate assembly comprising a support unit for a relatively small portion of the peripheral edge of the laminate assembly, said support unit comprising a channeled resilient member adapted to matingly receive said relatively small peripheral edge portion of the laminate assembly, the opposite end portions of said channeled resilient member each being shaped and arranged to provide one part of a leakproof joint, and an elongated, longitudinally grooved, flexible, sealing strip adapted to be wrapped about and to have its grooved portion matingly seated on all of the remaining peripheral edge portion of the laminate assembly, spaced portions of the groove in said sealing strip being adapted to engage the shaped end portions on said support unit resilient member and to provide therewith a complementary leakproof joint part that connects the sealing strip to the laminate assembly edge portion such that suction may be applied to the laminate edge throughout the length of the strip groove.

7. Apparatus for evacuating the space between the laminate sheets of a laminate assembly comprising a support unit for a relatively small portion of the peripheral edge of the laminate assembly, said support unit comprising a channeled resilient member adapted to matingly receive said relatively small peripheral edge portion of the laminate assembly, the opposite end portions of said channeled resilient member each being formed with tapered sides to provide one part of a leakproof joint, and an elongated, longitudinally grooved, flexible, sealing strip adapted to be wrapped about and to have its grooved portion matingly seated on all of the remaining peripheral edge portion of the laminate assembly, spaced portions of the groove in said sealing strip being adapted to engage the shaped end portions on said support unit resilient member and to provide therewith a complementary leakproof joint part that connects the sealing strip to the laminate assembly edge portion such that suction may be applied to the laminate edge throughout the length of the strip groove.

8. Apparatus for evacuating the space between the laminate sheets of a laminate assembly comprising a support unit for a relatively small portion of the peripheral edge of the laminate assembly, said support unit comprising a channeled resilient member adapted to matingly receive said relatively small peripheral edge portion of the laminate assembly, the opposite end portion of said channeled resilient member each being shaped and arranged to provide one part of a leakproof joint, an elongated, longitudinally grooved, flexible, sealing strip adapted to be wrapped about and to have its grooved portion matingly seated on all of the remaining peripheral edge portion of the laminate assembly, spaced portions of the groove in said sealing strip being adapted to engage the shaped end portions on said support unit resilient member and to provide therewith a complementary leakproof joint part that connects the sealing strip to the laminate assembly edge portion such that suction may be applied to the laminate edge throughout the length of the strip groove, and clamping means to hold the spaced portions of the grooved sealing strip in leakproof engagement with the end portions of the support unit resilient member.

9. Apparatus for evacuating the space between the laminate sheets of a laminate assembly comprising a support unit for a relatively small portion of the peripheral edge of the laminate assembly, said support unit comprising a channeled resilient member adapted to matingly receive said relatively small peripheral edge portion of the laminate assembly, the opposite end portion of said channeled resilient member each being shaped and arranged to provide one part of a leakproof joint, an elongated, longitudinally grooved, flexible, sealing strip adapted to be wrapped about and to have its grooved portion matingly seated on all of the remaining peripheral edge portion of the laminate assembly, spaced portions of the groove in said sealing strip being adapted to engage the shaped end portions on said support unit resilient member and to provide therewith a complementary leakproof joint part that connects the sealing strip to the laminate assembly edge portion such that suction may be applied to the laminate edge throughout the length of the strip groove, and resilient pressure clamps applied to the spaced portions of the sealing strip to hold said spaced portions in leakproof engagement with the complementary joint portions on the ends of the support unit resilient member.

10. Apparatus for evacuating the space between the laminate sheets of a laminate assembly comprising a support unit for a relatively small portion of the peripheral edge of the laminate assembly, said support unit comprising a channeled resilient member adapted to matingly receive said relatively small peripheral edge portion of the laminate assembly, the opposite end portion of said channeled resilient member each being shaped and arranged to provide one part of a leakproof joint, an elongated, longitudinally grooved, flexible, sealing strip adapted to be wrapped about and to have its grooved portion matingly seated on all of the remaining peripheral edge portion of the laminate assembly, spaced portions of the groove in said sealing strip being adapted to engage the shaped end portions on said support unit resilient member and to provide therewith a complementary leakproof joint part that connects the sealing strip to the laminate assembly edge portion such that suction may be applied to the laminate edge throughout the length of the strip groove, cam means applied to the spaced portions of sealing strip to hold said spaced portions in leakproof engagement with the complementary joint portions on the ends of the support unit resilient member and suction means connected to the groove of the sealing strip.

11. In apparatus as set forth in claim 6 wherein the groove of the flexible sealing strip is connected to a suction source to provide for evacuation of the space between the laminate sheets throughout the length of the laminate assembly peripheral edge portions enclosed by said sealing strip.

12. In apparatus as set forth in claim 7 wherein the support unit resilient member has suction means applied to the channel thereof to provide for evacuation of the space between the laminate assembly sheets through the relatively small peripheral edge portion of the assembly that is seated in the channel of said resilient member.

References Cited in the file of this patent

UNITED STATES PATENTS 2,948,645    Keim ------------------ Aug. 9, 1960